(12) United States Patent
Sue

(10) Patent No.: US 11,119,391 B2
(45) Date of Patent: Sep. 14, 2021

(54) OPTICAL UNIT

(71) Applicant: NIDEC SANKYO CORPORATION, Nagano (JP)

(72) Inventor: Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/830,255

(22) Filed: Mar. 25, 2020

(65) Prior Publication Data

US 2020/0310228 A1 Oct. 1, 2020

(30) Foreign Application Priority Data

Mar. 29, 2019 (JP) .............................. JP2019-068060

(51) Int. Cl.
*G03B 17/55* (2021.01)
*G03B 17/02* (2021.01)
*H04N 5/225* (2006.01)

(52) U.S. Cl.
CPC ............. *G03B 17/55* (2013.01); *G03B 17/02* (2013.01); *H04N 5/2253* (2013.01); *H04N 5/2257* (2013.01); *H04N 5/22521* (2018.08)

(58) Field of Classification Search
CPC ...... G03B 17/55; G03B 17/02; G03B 17/561; G03B 2205/0023; G03B 5/00; H04N 5/2253; H04N 5/2257; H04N 5/22521; H04N 5/23287
See application file for complete search history.

(56) References Cited

U.S. PATENT DOCUMENTS

| 7,782,395 B2 | 8/2010 | Lee et al. |
| 7,952,640 B2 | 5/2011 | Yamamiya |
| 7,961,220 B2 | 6/2011 | Orihashi et al. |
| 8,421,912 B2 | 4/2013 | Tobinaga et al. |
| 8,571,399 B2 | 10/2013 | Minamisawa et al. |
| 9,933,629 B2 | 4/2018 | Minamisawa |
| 2007/0109412 A1* | 5/2007 | Hara .................... H04N 5/2251 348/207.1 |

(Continued)

FOREIGN PATENT DOCUMENTS

| CN | 101098402 | 1/2008 |
| CN | 101141566 | 3/2008 |

(Continued)

OTHER PUBLICATIONS

Office Action of China Counterpart Application, with English translation thereof, dated May 7, 2021, pp. 1-19.

*Primary Examiner* — Jason A Flohre
(74) *Attorney, Agent, or Firm* — JCIPRNET

(57) ABSTRACT

Provided is an optical unit 10 including a movable body 14 provided with a camera module equipped with an image pickup element 50 and an optical element 12*a*, a fixed body 16, support mechanisms 9 and 20 configured to movably support the movable body 14 with respect to the fixed body 16, and drive units 18A to 18C configured to move the movable body 14 with respect to the fixed body 16. The movable body 14 is supported by the support mechanisms 9 and 20 in a state where the movable body 14 does not contact the fixed body 16 in an optical axis direction, and the optical unit 10 includes a heat dissipation member 11 made of metal and coupled to the image pickup element 50 and the support mechanisms 9 and 20.

6 Claims, 6 Drawing Sheets

(56) References Cited

U.S. PATENT DOCUMENTS

| | | | | |
|---|---|---|---|---|
| 2008/0043139 A1* | 2/2008 | Lee | ................... | H04N 5/2251 |
| | | | | 348/375 |
| 2011/0262122 A1* | 10/2011 | Minamisawa | ........... | G03B 5/00 |
| | | | | 396/55 |
| 2012/0276951 A1* | 11/2012 | Webster | ............... | H04N 5/2257 |
| | | | | 455/556.1 |
| 2013/0093947 A1* | 4/2013 | Lee | ....................... | G03B 17/55 |
| | | | | 348/374 |
| 2018/0171991 A1* | 6/2018 | Miller | .................... | F16M 11/18 |

FOREIGN PATENT DOCUMENTS

| | | |
|---|---|---|
| CN | 101299433 | 11/2008 |
| CN | 102177465 | 9/2011 |
| CN | 102823229 | 12/2012 |
| CN | 203720516 | 7/2014 |
| CN | 204031291 | 12/2014 |
| CN | 105247413 | 1/2016 |
| CN | 109212866 | 1/2019 |
| JP | 2012070272 | 4/2012 |
| JP | 2013197974 | 9/2013 |

\* cited by examiner

OPTICAL UNIT

CROSS-REFERENCE TO RELATED APPLICATION

This application claims the priority benefit of Japan Application No. 2019-068060, filed on Mar. 29, 2019. The entirety of the above-mentioned patent application is hereby incorporated by reference herein and made a part of this specification.

BACKGROUND

Field of the Invention

At least an embodiment of the present invention relates to an optical unit.

Description of the Related Documents

Conventionally, an optical unit capable of dissipating heat generated in a camera module is used. For example, Japanese Unexamined Patent Application Publication No. 2012-70272 discloses an image pickup element unit having a configuration in which heat generated in an image pickup element is dissipated onto a heat dissipation plate via a heat dissipation member.
[Patent Literature 1]
Japanese Unexamined Patent Application Publication No. 2012-70272

An optical unit includes a movable body provided with a camera module, a fixed body, and a support mechanism that movably supports the movable body with respect to the fixed body, and the optical unit may need to be miniaturized depending on a usage form of the optical unit. However, in a conventional optical unit including a movable body provided with a camera module, a fixed body, and a support mechanism that movably supports the movable body with respect to the fixed body, with increasing miniaturization, it is difficult to efficiently dissipate heat generated in the camera module without hindering movement of the movable body with respect to the fixed body. Therefore, an object of at least an embodiment of the present invention is to efficiently dissipate heat generated in a camera module without hindering movement of a movable body with respect to a fixed body.

SUMMARY

An optical unit according to at least an embodiment of the present invention includes a movable body including a camera module equipped with an image pickup element and an optical element, a fixed body, a support mechanism configured to movably support the movable body with respect to the fixed body, and a drive unit configured to move the movable body with respect to the fixed body. The movable body is supported by the support mechanism in a state where the movable body does not contact the fixed body in an optical axis direction, and the optical unit includes a heat dissipation member made of metal and coupled to the image pickup element and the support mechanism.

According to the present aspect, the movable body is supported by the support mechanism in a state where the movable body does not contact the fixed body in the optical axis direction, and thus, it is possible to prevent a hindrance of movement of the movable body with respect to the fixed body. Further, the heat dissipation member made of metal and coupled to the image pickup element and the support mechanism is provided, and thus, heat generated in the camera module can be efficiently dissipated.

In the optical unit according to at least an embodiment of the present invention, it is preferable that the heat dissipation member is coupled to a movement fulcrum portion, of the support mechanism, for moving the movable body with respect to the fixed body. In this way, a configuration for dissipating the heat generated in the camera module can be easily obtained without adding another member.

In the optical unit according to at least an embodiment of the present invention, it is preferable that the heat dissipation member is arranged to contact a side surface of the image pickup element intersecting the optical axis direction. In this way, the heat can be dissipated from the side surface of the image pickup element, and thus, an increase in thickness of the optical unit in the optical axis direction can be suppressed.

In the optical unit according to at least an embodiment of the present invention, it is preferable that the heat dissipation member is arranged to surround the image pickup element. In this way, an increase in the thickness of the optical unit in the optical axis direction can be suppressed, and a contact area with the image pickup element can be increased, and thus, the heat generated in the camera module can be dissipated particularly efficiently.

In the optical unit according to at least an embodiment of the present invention, it is preferable that the heat dissipation member is coupled to a land provided in the image pickup element. In this way, the heat can be dissipated from the land, and the heat generated in the camera module can be dissipated particularly efficiently.

In the optical unit according to at least an embodiment of the present invention, it is preferable that the support mechanism is configured to pivotably support the movable body with respect to the fixed body with the optical axis direction as a pivot axis. In this way, in a configuration in which the movable body is pivotable with respect to the fixed body with the optical axis direction as the pivot axis, the heat generated in the camera module can be efficiently dissipated, without hindering movement of the movable body with respect to the fixed body.

In the optical unit according to at least an embodiment of the present invention, it is preferable that the support mechanism includes a first support mechanism fixed to the fixed body, the first support mechanism being configured to swingably support the movable body with respect to the fixed body with a first direction intersecting the optical axis direction as a swing axis, and a second support mechanism fixed to the movable body, the second support mechanism being configured to swingably support the movable body with respect to the fixed body with a second direction intersecting both the optical axis direction and the first direction as a swing axis. In this way, in a configuration in which the movable body is swingable with respect to the fixed body with the first direction and the second direction as pivot axes, the heat generated in the camera module can be efficiently dissipated, without hindering movement of the movable body with respect to the fixed body.

In the optical unit according to at least an embodiment of the present invention, it is preferable that the heat dissipation member is a gimbal frame supported by the movable body and the fixed body via the support mechanism, and the gimbal frame is configured to be supported by the support mechanism as a result of a spherical convex surface and a spherical concave surface abutting with each other. In this way, a configuration for dissipating the heat generated in the camera module can be easily obtained without hindering movement of the movable body with respect to the fixed body.

The optical unit according to at least an embodiment of the present invention can efficiently dissipate the heat generated in the camera module, without hindering movement of the movable body with respect to the fixed body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
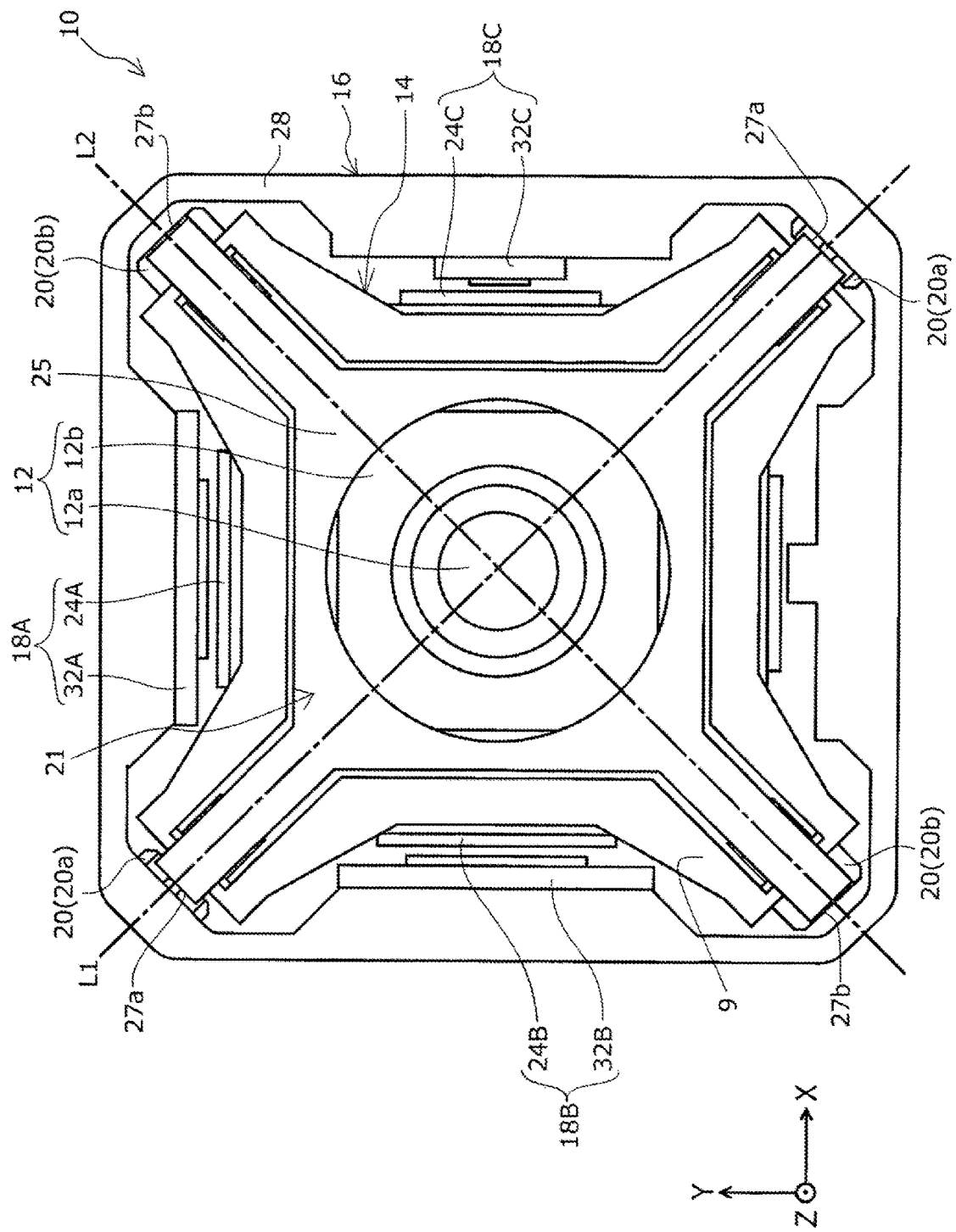
FIG. 1 is a plan view of an optical unit according to a first embodiment of the present invention.

Below, embodiments of the present invention will be described with reference to the drawings. It is noted that the same reference numerals are given to the same components in each of the embodiments, and these components will only be described in an embodiment where they first appear, and their description will be omitted in the following embodiments.

First Embodiment (FIGS. 1 to 5)

Figure 2:
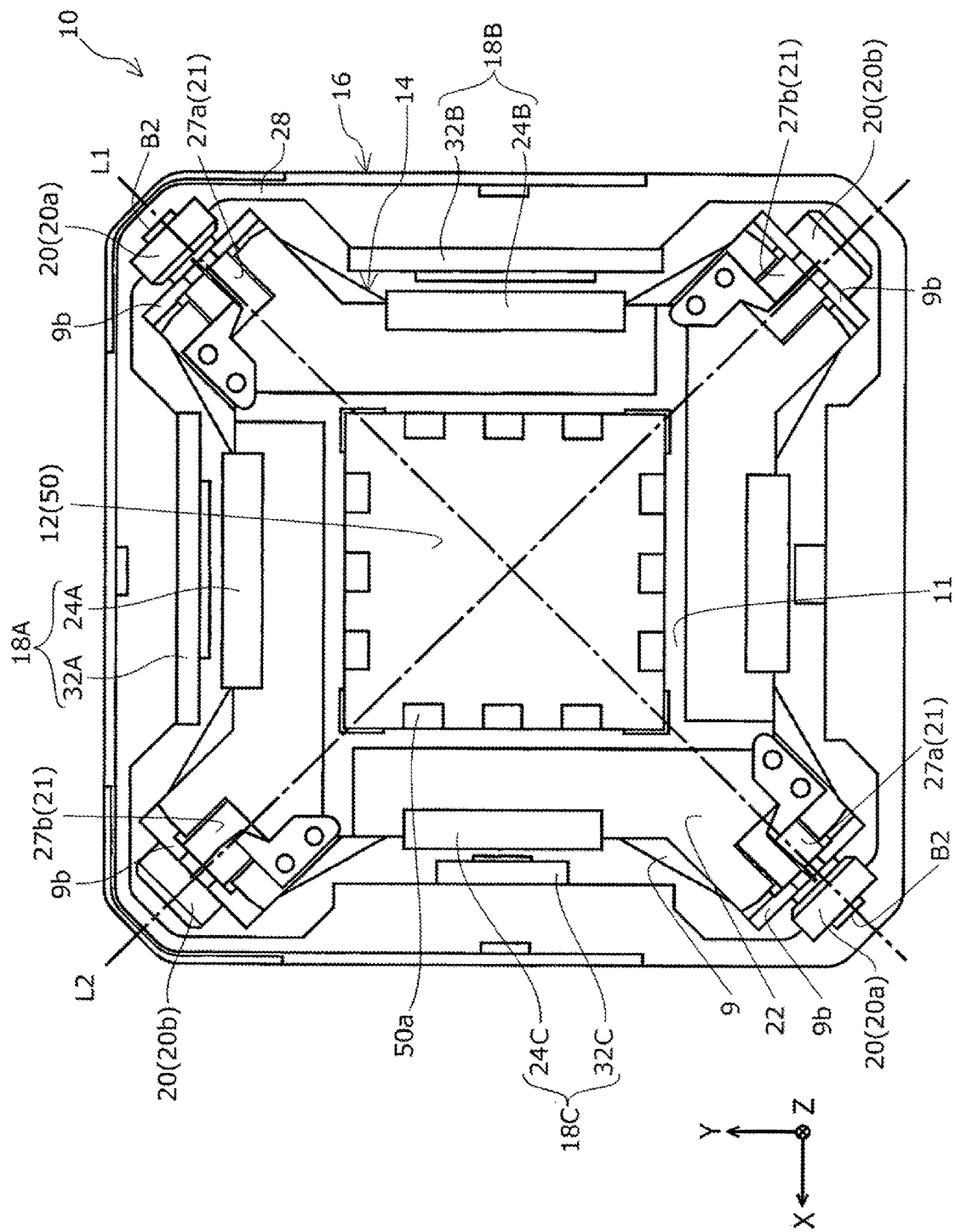
FIG. 2 is a bottom view of the optical unit according to the first embodiment of the present invention.

First, an optical unit according to a first embodiment of the present invention will be described with reference to FIGS. 1 to 5. It is noted that in FIG. 3, a dash-dot-dash line denoted by reference numeral L indicates an optical axis. In FIGS. 1 and 2, a dash-dot-dash line denoted by reference numeral L1 indicates a first axial line intersecting the optical axis, and a dash-dot-dash line denoted by reference numeral L2 indicates a second axial line L2 intersecting the optical axis L and the first axial line L1. Further, in each of the figures, a Z-axis direction is an optical axis direction, an X-axis direction is a direction intersecting the optical axis, in other words, a yawing axial direction, and a Y-axis direction is a direction intersecting the optical axis, in other words, a pitching axial direction.

Overview of Overall Configuration of Optical Unit

A configuration of an optical unit 10 according to the present embodiment will be described with reference to FIGS. 1 to 3. The optical unit 10 includes a movable body 14 provided with an optical module 12, and a fixed body 16 configured to hold the movable body 14 to be displaceable in a direction (roll direction) having the Z-axis direction (optical axis direction) as a pivot axis, in a direction (pitch direction) having the Y-axis direction as a pivot axis, and in a direction (yaw direction) having the X-axis direction as a pivot axis. Further, the optical unit 10 includes pivot drive mechanisms 18A to 18C configured to drive the movable body 14 in the roll direction, in the pitch direction, and in the yaw direction, a thrust receiving member 20 configured to pivotably support the movable body 14 in the pitch direction and in the yaw direction with respect to the fixed body 16, and a roll fixed body 9 supported by the thrust receiving member 20, the roll fixed body 9 being configured to support the movable body 14 pivotably in the roll direction with respect to the fixed body 16. Here, the thrust receiving member 20 and the roll fixed body 9 serve as a support mechanism that movably supports the movable body 14 with respect to the fixed body 16.

Further, the optical unit 10 includes a gimbal mechanism 21 provided with a gimbal frame 25. The gimbal frame 25 includes a first-support-unit extending unit 27a extending from both end units of the gimbal frame 25 on the first axial line L1 along the optical axis direction and a second-support-unit extending unit 27b extending from both end units of the gimbal frame 25 on the second axial line L2 along the optical axis direction. Further, the optical unit 10 includes a rolling frame 11 fixed to the optical module 12 that is a camera module of the movable body 14.

Optical Module

In the present embodiment, the optical module 12 is formed in a substantially rectangular casing shape, and is used, for example, as a thin camera mounted in a mobile phone equipped with a camera, a tablet PC, or the like. The optical module 12 includes a lens 12a (optical element) on an object side, and an optical device or the like for capturing an image is built in a housing 12b having a rectangular casing shape. As an example, the optical module 12 according to the present embodiment incorporates an actuator configured to correct rolling (shake in a pivoting direction with the Z-axis direction as a pivot axis), pitching (shake in a pivoting direction with the Y-axis direction as a pivot axis), and yawing (shake in a pivoting direction with the X-axis direction as a pivot axis), which are generated in the optical module 12 and is configured to correct pitching and yawing.

It is noted that in the present embodiment, the optical module 12 is configured to correct rolling, pitching, and yawing, however, the optical module 12 is not limited to this configuration. For example, the optical module 12 may be configured to correct only one or two of rolling, pitching, and yawing.

Image Pickup Element

Figure 3:
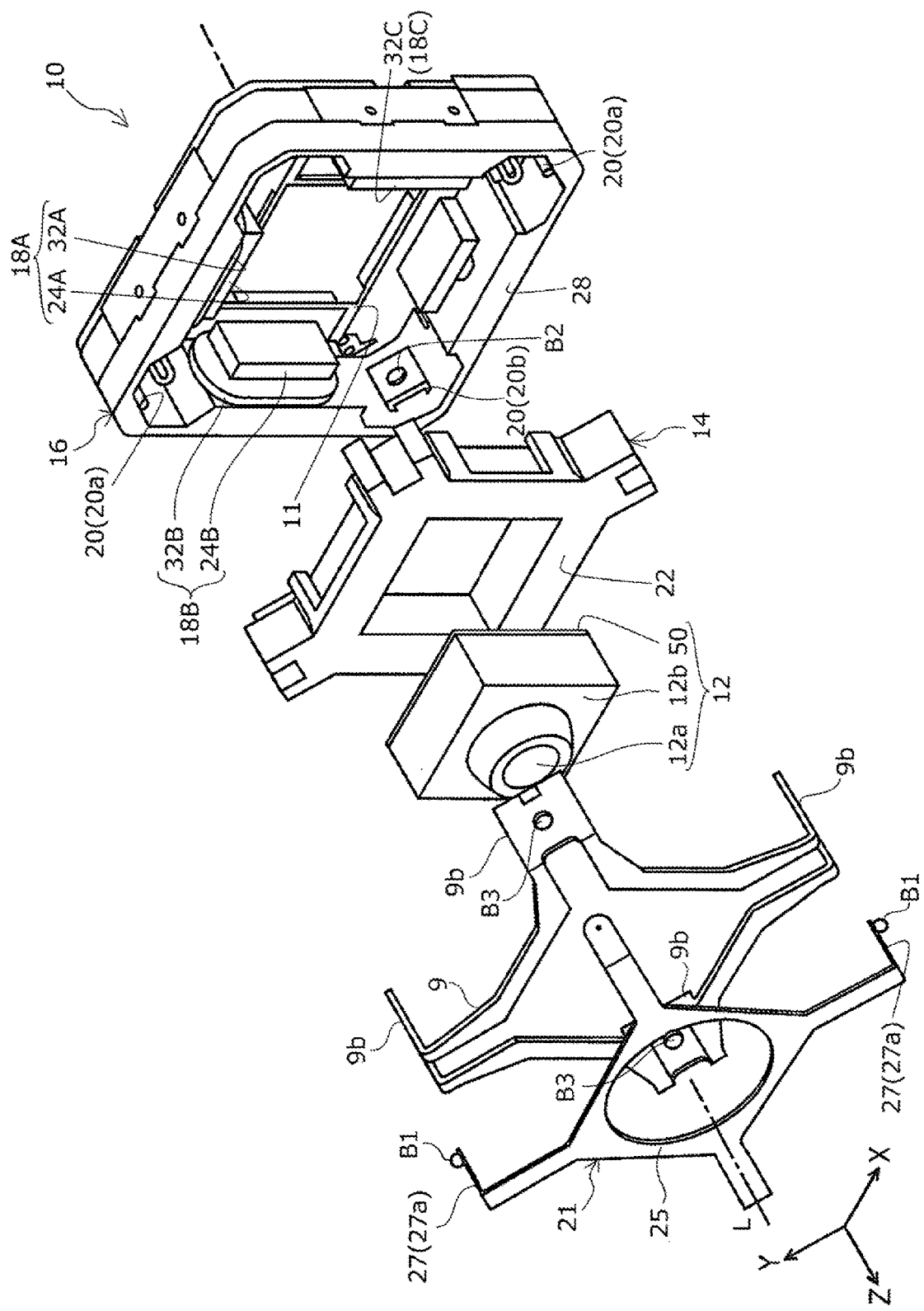
FIG. 3 is an exploded perspective view of the optical unit according to the first embodiment of the present invention.

As illustrated in FIGS. 2 and 3, the optical module 12 includes an image pickup element 50 on an opposite side (rear surface) of the object side. The image pickup element 50 is fixed to a rear surface of the housing 12b. Further, as illustrated in FIG. 2, the image pickup element 50 includes a plurality of lands 50a. The lands 50a are copper foil constituting a ground of the image pickup element 50, and the lands 50a are fixed by being soldered to the rolling frame 11 made of metal.

Movable Body

In FIGS. 1 to 3, the movable body 14 includes the optical module 12, a holder frame 22, the roll fixed body 9, and magnets 24A to 24C. The holder frame 22 is configured as a rectangular frame-shaped member provided to surround the remaining four surfaces of the optical module 12 except a front surface (surface on the object side) on which the lens 12a of the optical module 12 is provided and a rear surface on the opposite side. As one example, the holder frame 22 according to the present embodiment is configured so that the optical module 12 and the roll fixed body 9 are detachable from the holder frame 22. The magnets 24A to 24C for correcting rolling, pitching, and yawing are attached to outer surfaces of three surfaces of the holder frame 22 facing the fixed body 16. It is noted that in FIG. 3, the magnets 24A to 24C are illustrated at positions separated from the holder frame 22 to facilitate understanding of the positions where the magnets 24A to 24C are provided, however, the magnets 24A to 24C are attached to the holder frame 22.

Fixed Body

In FIGS. 1 to 3, the fixed body 16 includes a fixed frame 28 and coils 32A to 32C. It is noted that the coils 32A to 32C are attached to the fixed frame 28 at positions facing the magnets 24A to 24C. As illustrated in FIG. 2, in the present embodiment, in a state where the movable body 14 is arranged in the fixed body 16, the magnet 24A and the coil 32A, the magnet 24B and the coil 32B, and the magnet 24C and the coil 32C face each other, respectively. Further, in the present embodiment, the pair of the magnet 24A and the coil 32A, the pair of the magnet 24B and the coil 32B, and the pair of the magnet 24C and the coil 32C constitute the pivot drive mechanisms 18A to 18C, respectively. That is, the pivot drive mechanisms 18A to 18C are provided on three surfaces where the movable body 14 and the fixed body 16 face each other, the three surfaces intersecting with the optical axis direction, and the pivot drive mechanisms 18A to 18C serve as drive units configured to move the movable body 14 with respect to the fixed body 16. The pivot drive mechanisms 18A to 18C correct rolling, pitching, and yawing of the movable body 14. It is noted that in the present embodiment, as one example, the coils 32A to 32C are formed of sheet-shaped coils. However, a wound coil or the like may be employed instead of the sheet-shaped coil.

Further, rolling, pitching, and yawing are corrected as follows. If a shake in at least any one direction of the roll direction, the pitch direction, and the yaw direction occurs in the optical unit 10, the shake is detected by a shake detection sensor (gyroscope) (not illustrated), and the pivot drive mechanisms 18A to 18C are driven based on this result. Afterwards, the pivot drive mechanisms 18A to 18C act to correct the shake of the optical unit 10 with high accuracy, using a magnetic sensor (Hall element) (not illustrated) or the like. That is, a current is applied to each of the coils 32A to 32C to move the movable body 14 in a direction where the shake of the optical unit 10 is cancelled, and thus, the shake is corrected.

The optical unit 10 according to the present embodiment includes the pivot drive mechanisms 18A to 18C configured to pivot the movable body 14 with respect to the fixed body 16 with the optical axis direction, and the first axial line L1 and the second axial line L2 as pivot axes. It is noted that the movable body 14 pivots in the pitching axial direction and in the yawing axial direction, as a result of a combination of pivoting around the first axial line L1 and pivoting around the second axial line L2.

Gimbal Mechanism

The gimbal mechanism 21 is formed by bending a metal plate material and has a spring property. Specifically, as illustrated in FIG. 3, the gimbal mechanism 21 according to the present embodiment includes the gimbal frame 25 and includes the two first-support-unit extending units 27a and the two second-support-unit extending units 27b, which are formed by being bent at the four corners of the gimbal frame 25 by 90° toward the opposite side of the object side in the optical axis direction. It is noted that all of the first-support-unit extending units 27a and the second-support-unit extending units 27b are not necessarily plate-shaped, and only some thereof may be plate-shaped to exhibit the spring property. With such a configuration, the gimbal mechanism 21 according to the present embodiment is configured to apply a pressure outward.

Thrust Receiving Member

The thrust receiving member 20 pivotably supports the movable body 14 with respect to the fixed body 16 with the first axial line L1 and the second axial line L2 as pivot axes. The thrust receiving member 20 includes two first thrust receiving members 20a configured to support the first-support-unit extending units 27a and two second thrust receiving members 20b configured to support the second-support-unit extending units 27b. Further, the first thrust receiving members 20a are arranged at two opposing positions of the four corners of the rectangular frame-shaped fixed frame 28 of the fixed body 16, and the second thrust receiving members 20b are arranged at two opposing positions of the four corners of the rectangular frame-shaped movable body 14 (specifically, bent units 9b of the roll fixed body 9). That is, the first thrust receiving members 20a are fixed to the fixed body 16, and the second thrust receiving members 20b are fixed to the movable body 14. It is noted that the rectangular frame-shaped fixed frame 28 and the rectangular frame-shaped movable body 14 are arranged so that the positions of the four corners are aligned, and each of the first thrust receiving members 20a and the second thrust receiving members 20b is arranged at each of the four corners.

It is noted that a spherical convex surface B1 protruding outward is provided in the first-support-unit extending unit 27a (see FIG. 3), a spherical concave surface B2 recessed outward is provided in the first thrust receiving member 20a at a position abutting with the spherical convex surface B1 (see FIG. 2), and if the spherical convex surface B1 and the spherical concave surface B2 abut with each other, the first-support-unit extending unit 27a is supported by the first thrust receiving member 20a. Similarly, a spherical convex surface B1 protruding inward is provided in the second-support-unit extending unit 27b, a spherical concave surface B2 recessed inward is provided in the second thrust receiving member 20b at a position abutting with the spherical convex surface B1 (see FIG. 3), and if the spherical convex surface B1 and the spherical concave surface B2 abut with each other, the second-support-unit extending unit 27b is supported by the second thrust receiving member 20b.

Roll Fixed Body

As illustrated in FIGS. 1 and 2, the roll fixed body 9 is fixed to the gimbal frame 25 via the first thrust receiving member 20a at two positions in a direction along the first axial line L1 and is fixed to the gimbal frame 25 via the second thrust receiving member 20b at two positions in a direction along the second axial line L2. More specifically, a hole unit B3 is formed in the bent unit 9b and the spherical convex surfaces B1 of the first-support-unit extending unit 27a, and the second-support-unit extending unit 27b abut with the spherical concave surfaces B2 of the first thrust receiving member 20a and the second thrust receiving member 20b through the hole unit B3, and thus, the roll fixed body 9 is fixed to the gimbal frame 25.

Here, the gimbal frame 25 is fixed to the fixed frame 28 of the fixed body 16 via the first thrust receiving members 20a at two positions in the direction along the first axial line L1. That is, the roll fixed body 9 is pivotable with respect to the fixed body 16 with the first axial line L1 as the pivot axis. Further, the gimbal frame 25 is pivotable with respect to the roll fixed body 9 with the second axial line L2 as the pivot axis. If the roll fixed body 9 is configured thus, it can be said that the movable body 14 according to the present embodiment is supported by the thrust receiving member 20 and the roll fixed body 9 serving as the support mechanism, without contacting other members of the fixed body 16 in the optical axis direction.

Rolling Frame 11

Next, with reference to FIGS. 4 and 5 in addition to FIGS. 1 to 3, the rolling frame 11 being a main part of the optical unit 10 according to the present embodiment will be described in detail.

Figure 4:
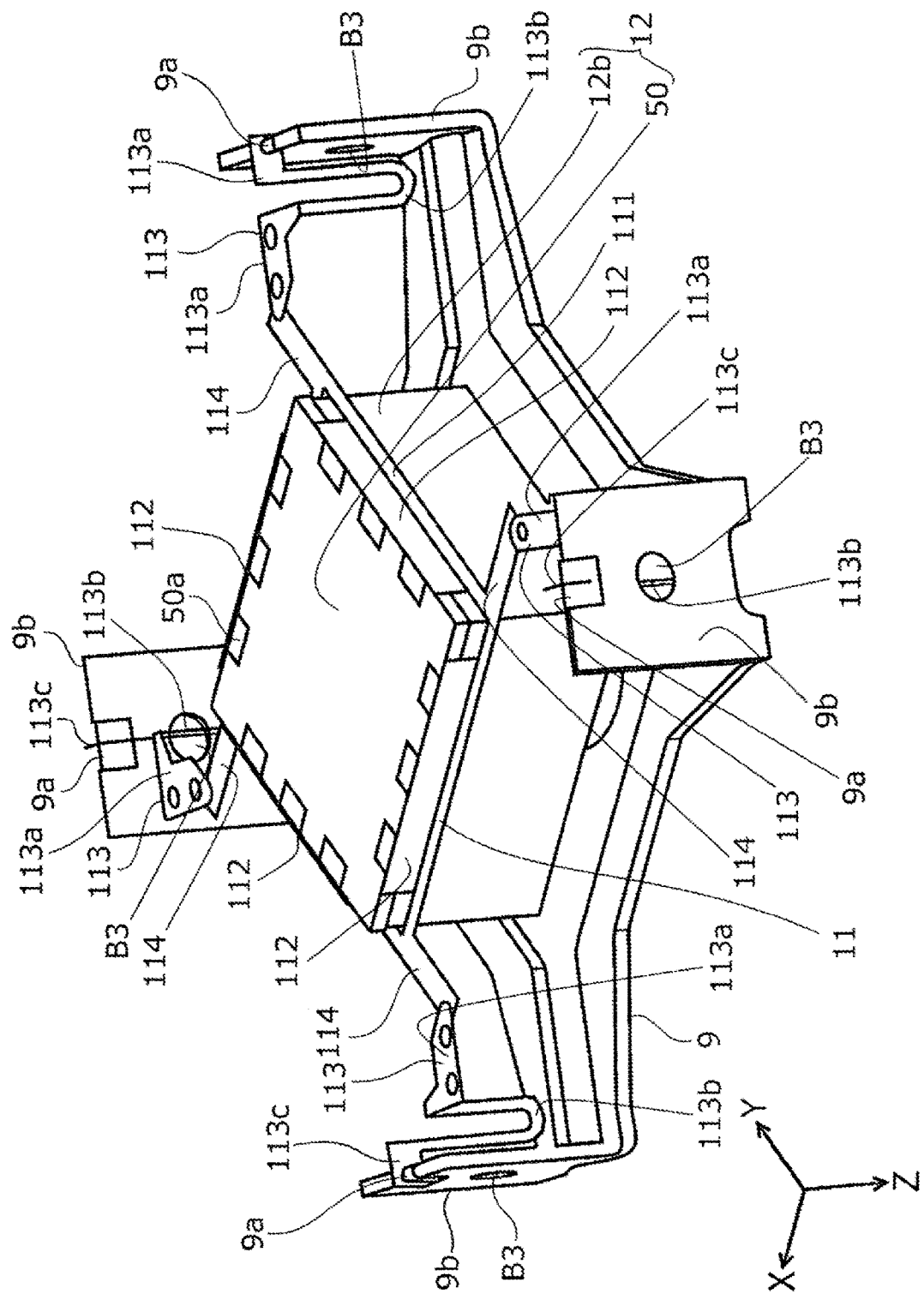
FIG. 4 is a perspective view of a heat dissipation mechanism of the optical unit according to the first embodiment of the present invention.
Figure 5:
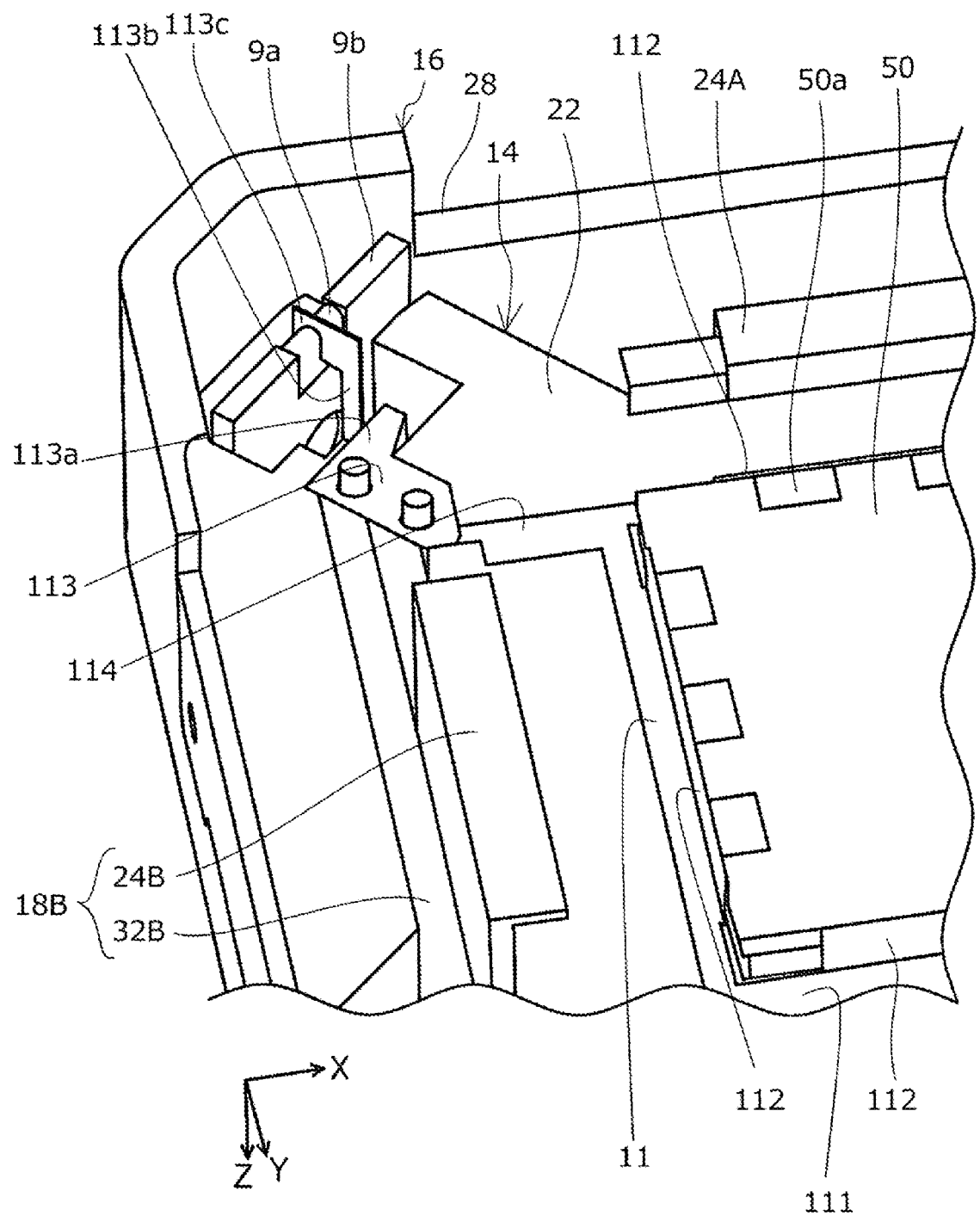
FIG. 5 is an enlarged perspective view of a part of the heat dissipation mechanism of the optical unit according to the first embodiment of the present invention.

As illustrated in FIG. 4, the rolling frame 11 according to the present embodiment includes a rectangular frame-shaped unit 111 arranged in a peripheral direction intersecting the optical axis direction in the image pickup element 50, a protruding unit 112 protruding from the rectangular frame-shaped unit 111 in the optical axis direction and being soldered to the lands 50a of the image pickup element 50, and a coupling unit 113 for the roll fixed body 9 coupled to an extending unit 114 extending outward from four corners of the rectangular frame-shaped unit 111. The protruding unit 112 includes the four protruding units 112 which are formed corresponding to the lands 50a formed on each of the four side surfaces of the rectangular image pickup element 50. Further, the coupling unit 113 includes the four coupling units 113 which are formed corresponding to the four corners of the roll fixed body 9.

Here, the coupling unit 113 includes a fixed unit 113a fixed to the extending unit 114, a U-shaped unit 113b having a substantial U-shape, and an engaging unit 113c to be movably engaged with an engaged unit 9a provided at a leading end portion of the bent unit 9b of the roll fixed body 9. The U-shaped unit 113b has a thin plate shape and deforms to allow for pivoting of the optical module 12 in the roll direction with respect to the roll fixed body 9.

It is noted that, for example, the optical module 12 such as the image pickup element 50 generates heat during using the optical unit 10, and in the optical unit 10 according to the present embodiment, the lands 50a of the image pickup element 50, the rolling frame 11 contacting the side surface of the image pickup element 50 and being coupled to the lands 50a by soldering, and the roll fixed body 9 coupled to the rolling frame 11 are all made of metal. Therefore, the optical unit 10 according to the present embodiment is configured to efficiently dissipate the heat in the image pickup element 50. Here, the metal of which the above-mentioned constitution element is made includes, but not particularly limited to, stainless steel and copper.

Thus, the optical unit 10 according to the present embodiment includes the rolling frame 11 being a heat dissipation member made of metal and coupled to the image pickup element 50 and the roll fixed body 9, and therefore, heat generated in the optical module 12 can be efficiently dissipated. Further, as described above, in the optical unit 10 according to the present embodiment, the movable body 14 is supported by the thrust receiving member 20 and the roll fixed body 9 in a state where the movable body 14 does not contact other members of the fixed body 16 in the optical axis direction, and thus, it is possible to prevent a hindrance to movement of the movable body 14 with respect to the fixed body 16.

Here, as described above, the movable body 14 according to the present embodiment includes the rolling frame 11 provided with the engaging unit 113c movably engaged with the engaged unit 9a, and thus, the movable body 14 is configured to pivot in the roll direction with the engaged unit 9a provided at the leading end portion of the bent unit 9b of the roll fixed body 9 as a movement fulcrum. That is, in the optical unit 10 according to the present embodiment, the rolling frame 11 is coupled to a movement fulcrum portion, of the roll fixed body 9, for moving the movable body 14 with respect to the fixed body 16. With such a configuration, the optical unit 10 according to the present embodiment is simply configured to dissipate the heat generated in the optical module 12, without providing an additional member.

Further, as described above, the rolling frame 11 according to the present embodiment is arranged to contact a side surface of the image pickup element 50 intersecting the optical axis direction (specifically, the protruding unit 112 is in surface contact with the side surface of the image pickup element 50). Therefore, the optical unit 10 according to the present embodiment is configured to dissipate heat from the side surface of the image pickup element 50, and thus, an increase in thickness of the optical unit 10 is suppressed in the optical axis direction.

Further, as described above, the rolling frame 11 according to the present embodiment is arranged to surround the image pickup element 50. Therefore, the optical unit 10 according to the present embodiment has a configuration in which an increase in the thickness of the optical unit 10 is suppressed in the optical axis direction, a contact area between the rolling frame 11 and the image pickup element 50 is increased, and heat generated in the optical module 12 is dissipated particularly efficiently.

Further, as described above, the rolling frame 11 according to the present embodiment is coupled to the lands 50a provided in the image pickup element 50. Therefore, the optical unit 10 according to the present embodiment is configured to dissipate heat from the lands 50a and to dissipate particularly efficiently the heat generated in the optical module 12.

Further, as described above, the roll fixed body 9 according to the present embodiment is configured to pivotably support the movable body 14 with respect to the fixed body 16 with the optical axis direction as the pivot axis (the rolling can be corrected). In the configuration in which the movable body 14 is pivotable with respect to the fixed body 16 with the optical axis direction as a pivot axis, the optical unit 10 according to the present embodiment is configured to efficiently dissipate heat generated in the optical module 12, without hindering movement of the movable body 14 with respect to the fixed body 16.

Figure 6:
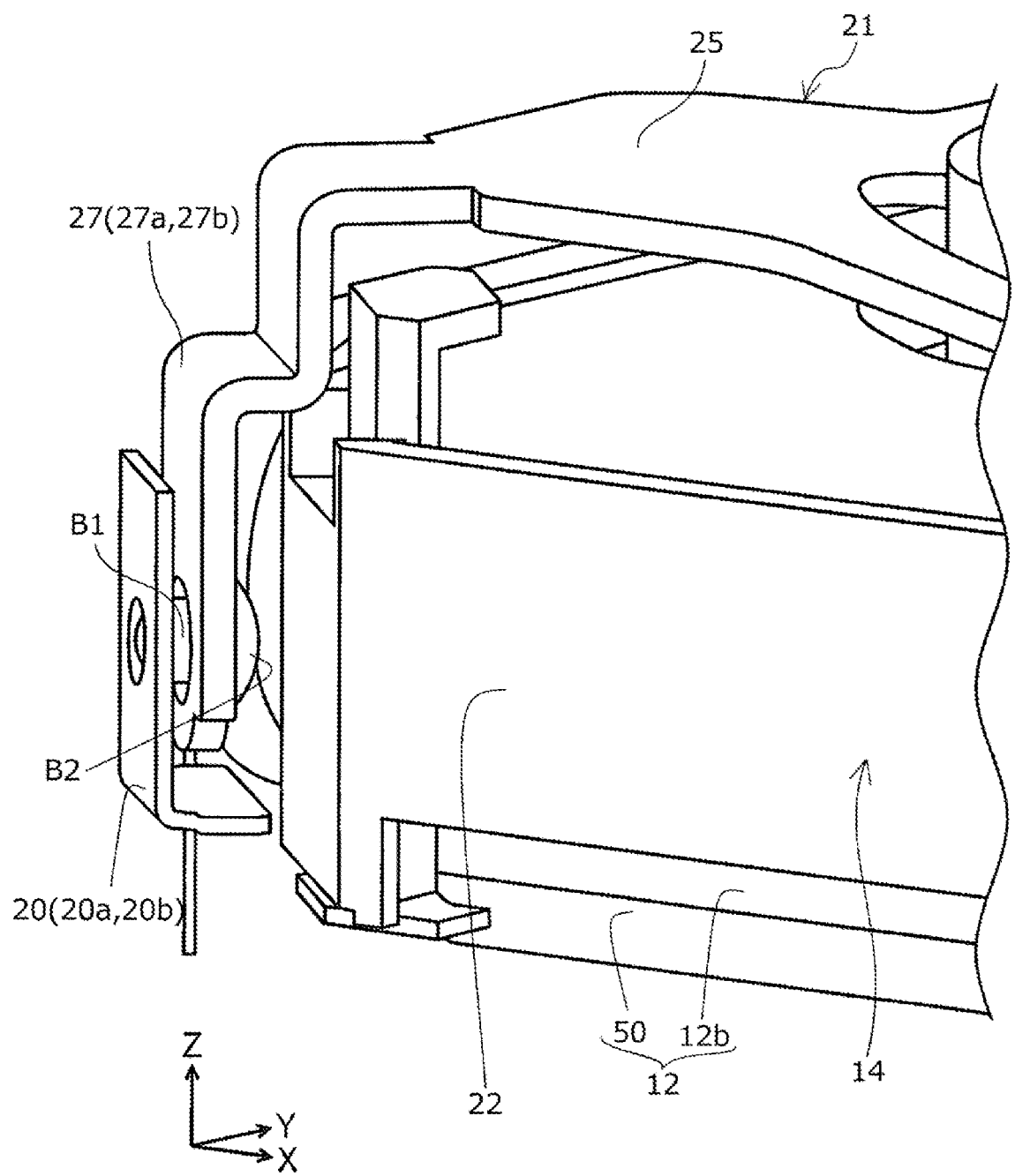
FIG. 6 is an enlarged perspective view of a part of a heat dissipation mechanism of an optical unit according to a second embodiment of the present invention.

Second Embodiment (FIG. 6)

Next, the optical unit 10 according to a second embodiment will be described with reference to FIG. 6. It is noted that constitution members common to the first embodiment are denoted by the same reference numerals, and detailed description thereof will be omitted.

As described above, the optical unit 10 according to the first embodiment has a configuration in which the support mechanism supports the movable body 14 with respect to the fixed body 16 so that the rolling can be corrected. On the other hand, the optical unit 10 according to the present embodiment does not include the roll fixed body 9 and the rolling frame 11 and has a configuration that in which the movable body 14 is supported so that the support mechanism can correct only the pitching and the yawing by the gimbal frame 25 and the thrust receiving member 20 made of metal. It is noted that the first thrust receiving member 20a according to the present embodiment is fixed to the fixed frame 28 of the fixed body 16, and the second thrust receiving member 20b according to the present embodiment is fixed to the holder frame 22 of the movable body 14.

As illustrated in FIG. 6, in the support mechanism according to the present embodiment, the spherical concave surface B2 recessed inward is provided in the first-support-unit extending unit 27a and the second-support-unit extending unit 27b, the spherical convex surface B1 protruding inward is provided at a position abutting with the spherical concave surface B2 in the first thrust receiving member 20a and the second thrust receiving member 20b, and the first-support-unit extending unit 27a and the second-support-unit extending unit 27b are supported by the first thrust receiving member 20a and the second thrust receiving member 20b as a result of the spherical concave surface B2 abutting with the spherical convex surface B1. It is noted that in the optical unit 10 according to the present embodiment, the first-support-unit extending unit 27a and the first thrust receiving member 20a have a configuration similar to that of the second-support-unit extending unit 27b and the second thrust receiving member 20b, respectively.

That is, in the optical unit 10 according to the present embodiment, the thrust receiving member 20 serving as the support mechanism includes the first thrust receiving member 20a serving as a first support mechanism being fixed to the fixed body 16 and swingably supporting the movable body 14 with respect to the fixed body 16 with a first direction (direction of the first axial line L1) intersecting the optical axis direction as a swing axis, and the second thrust receiving member 20b serving as a second support mechanism being fixed to the movable body 14 and swingably supporting the movable body 14 with respect to the fixed body 16 with a second direction (direction of the second axial line L2) intersecting both the optical axis direction and the first direction as a swing axis. The optical unit 10 according to the present embodiment, in a configuration in which the movable body 14 is swingable with respect to the fixed body 16 with the first direction and the second direction as swing axes, is configured to efficiently dissipate heat generated in the optical module 12, without hindering movement of the movable body 14 with respect to the fixed body 16.

Here, in the optical unit 10 according to the present embodiment, the heat dissipation member is the gimbal frame 25 supported by the movable body 14 and the fixed body 16 via the thrust receiving member 20, and the gimbal frame 25 is configured to be supported by the thrust receiving member 20 as a result of the spherical convex surface B1 abutting with the spherical concave surface B2. With such a configuration, the optical unit 10 according to the present embodiment is simply configured to dissipate heat generated in the optical module 12, without hindering movement of the movable body 14 with respect to the fixed body 16.

It is noted that the optical unit 10 according to the first embodiment is also configured to efficiently dissipate, via the gimbal frame 25, heat generated in the optical module 12 and has features similar to those of the optical unit 10 according to the present embodiment.

The present invention is not limited to the above-described embodiments, and can be realized with various configurations without departing from the spirit of the present invention. For example, the technical features in the embodiments corresponding to the technical features in each of the aspects described in SUMMARY may be appropriately replaced or combined to solve some or all of the problems described above, or to achieve some or all of the effects described above.

Further, unless the technical features are described as essential in the present specification, it may be omitted as appropriate.

What is claimed is:

1. An optical unit comprising:
a movable body including a camera module equipped with an image pickup element and an optical element;
a fixed body;
a support mechanism configured to movably support the movable body with respect to the fixed body; and
a drive unit configured to move the movable body with respect to the fixed body, wherein
the movable body is supported by the support mechanism in a state where the movable body does not contact the fixed body in an optical axis direction,
the optical unit includes a heat dissipation member made of metal and coupled to the image pickup element and the support mechanism,
the heat dissipation member comprises a rolling frame coupled to lands of the image pickup element,
the rolling frame comprises a frame-shaped unit arranged around the image pickup element and a coupling unit extending outward from the frame-shaped unit and coupled to the support mechanism,
the coupling unit has a thin plate shape and comprises a U-shaped unit having a substantial U-shape and allowing for pivoting of the camera module in a roll direction, and
the movable body including the camera module is held so as to be displaceable in the roll direction with the optical axis direction as a pivot axis via the coupling unit of the rolling frame,
wherein heat in the image pickup element is dissipated to the support mechanism via the coupling unit of the rolling frame.

2. The optical unit according to claim 1, wherein the coupling unit of the rolling frame is coupled to a movement fulcrum portion, of the support mechanism, for moving the movable body with respect to the fixed body.

3. The optical unit according to claim 1, wherein the frame-shaped unit of the rolling frame is arranged to contact a side surface of the image pickup element intersecting the optical axis direction.

4. The optical unit according to claim 3, wherein the frame-shaped unit of the rolling frame is arranged to surround the image pickup element.

5. An optical unit comprising:
a movable body including a camera module equipped with an image pickup element and an optical element;
a fixed body;
a support mechanism configured to movably support the movable body with respect to the fixed body; and
a drive unit configured to move the movable body with respect to the fixed body, wherein
the movable body is supported by the support mechanism in a state where the movable body does not contact the fixed body in an optical axis direction,
the optical unit includes a heat dissipation member made of metal and coupled to the image pickup element and the support mechanism,
the heat dissipation member is a gimbal frame supported by the movable body and the fixed body via the support mechanism, and
the gimbal frame is configured to be supported by the support mechanism as a result of a spherical convex surface and a spherical concave surface abutting with each other.

6. The optical unit according to claim 5, wherein the support mechanism comprises:

a first support mechanism fixed to the fixed body, the first support mechanism being configured to swingably support the movable body with respect to the fixed body with a first direction intersecting the optical axis direction as a swing axis; and
a second support mechanism fixed to the movable body, the second support mechanism being configured to swingably support the movable body with respect to the fixed body with a second direction intersecting both the optical axis direction and the first direction, as a swing axis.

* * * * *